US006862844B1

(12) United States Patent
Rubicz

(10) Patent No.: US 6,862,844 B1
(45) Date of Patent: Mar. 8, 2005

(54) PLANT POT INCLUDING A REMOVABE BASE

(76) Inventor: David J. Rubicz, 405 Hickory Dr., Davis Junction, IL (US) 61020

( * ) Notice: Subject to any disclaimer, the term of this patent is extended or adjusted under 35 U.S.C. 154(b) by 0 days.

(21) Appl. No.: 10/656,760

(22) Filed: Sep. 8, 2003

(51) Int. Cl.$^7$ ................................................. A01G 9/04
(52) U.S. Cl. ............................................................ 47/71
(58) Field of Search ............................... 47/71, 32, 66, 47/73; 206/527, 804; 249/74

(56) References Cited

U.S. PATENT DOCUMENTS

| | | | |
|---|---|---|---|
| 357,698 A | * | 2/1887 | Burrough ........................ 47/71 |
| 2,058,934 A | | 10/1936 | Yohe |
| 3,328,913 A | | 7/1967 | Vogt |
| 3,432,027 A | | 3/1969 | Mueller |
| RE28,106 E | * | 8/1974 | Lee .............................. 425/89 |
| 4,027,429 A | | 6/1977 | Georgi |
| 4,232,482 A | * | 11/1980 | Watt et al. ...................... 47/71 |
| 4,457,104 A | | 7/1984 | Hefner |
| D364,112 S | | 11/1995 | Dickinson et al. |
| 5,868,266 A | * | 2/1999 | Nobakht ................... 220/23.86 |
| 6,357,180 B1 | | 3/2002 | Huang |

* cited by examiner

Primary Examiner—Teri P. Luu
Assistant Examiner—Francis T. Palo

(57) ABSTRACT

A pot for the planting and easy removal of plants includes a housing and a push stand operably engageable therewith. The housing includes top and bottom portions, and a sidewall integral therewith. The bottom portion of the housing includes a base member removably positionable on a lip portion formed around an inner perimeter of the bottom portion and having a substantially annular shape with an aperture centrally disposed therein. The push includes a top and bottom portion, and a sidewall diverging downwardly therefrom between the top and bottom portions. The top portion includes a nipple extending upwardly therefrom and removably insertable into the aperture of the base member for assisting to securely move the base member upwardly through the housing. When the housing is moved downwardly along the push stand, the base member and root system of the plant are pushed upwardly and easily lifted out of the pot.

18 Claims, 3 Drawing Sheets

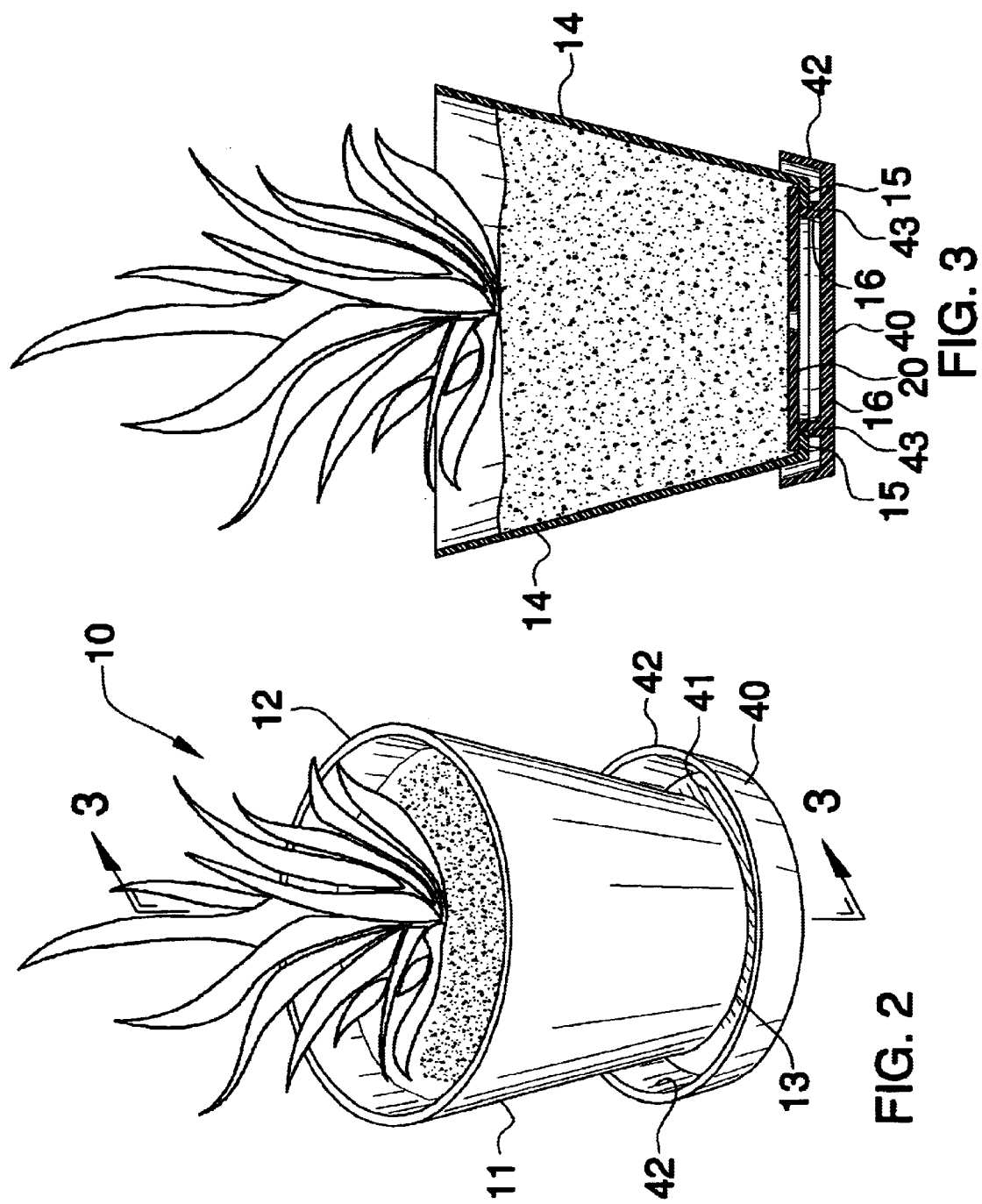

PLANT POT INCLUDING A REMOVABE BASE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to plant pots and, more particularly, to a plant pot with a removable base for removing plants with greater ease and less damage to the root system.

2. Prior Art

Many types of plants such as house plants or garden plants are started in small plastic containers, especially in the nursery business, and then replanted for growing purposes either by the nursery or the buyer. Many of the containers are generally formed of a brittle plastic such as styrene that has a tendency to crack when pressure is exerted on them. It is difficult, if not impossible, to remove a plant and its potting soil from these containers without breaking the containers or damaging the root system of the plant. As a result, increased costs are incurred because the pots are not reusable and some of the plants die or fail to reach their optimum growth size because of damage to the roots.

Even pots made of pliable or flexible plastic can present problems when the pots become heavy. This is particularly true in larger pots containing bushes and small trees. Because of the time spent in a larger pot, the plant can be difficult to remove from the pot due to the weight involved and the fact that the plant has had time to develop an extensive root system. In situations such as this it is difficult for one person to lift the plant out of the pot without damaging the root system. The stem or trunk of the plant can also be damaged when the planter tries to pull the plant out of the pot and is unsuccessful, or is forced to twist and shake the stem or trunk in an attempt to free the plant from the pot.

Accordingly, a need remains for a plant pot that is formed from durable plastic and provides for easy lifting of the plant and topsoil out of the pot without damage to the root system.

BRIEF SUMMARY OF THE INVENTION

In view of the foregoing background, it is therefore an object of the present invention to make it easier to remove plants from pots without damaging their root systems. These and other objects, features, and advantages of the invention are provided by a plant pot including a housing for maintaining a plant therein with top and bottom portions and a sidewall integral therewith and extending therebetween. The housing has a centrally disposed longitudinal axis wherein the sidewall is spaced and diverges upwardly therefrom.

The top portion of the housing is open for allowing a plant to be selectively positioned within the housing and the bottom portion includes a lip portion formed around a perimeter thereof and including an inner edge portion for defining an opening therebetween. The bottom portion further includes a base member with a substantially annular shape removably positionable on the lip portion for maintaining a plant thereabove. Such a base member is provided with an aperture disposed substantially centrally thereof.

The plant pot further includes a push stand having top and bottom portions and a sidewall diverging downwardly between the top and bottom portions. The push stand includes a nipple connected to the top portion thereof. Such a nipple is substantially aligned with the aperture and extends upwardly therefrom. Advantageously, the nipple is removably insertable into the aperture for assisting to securely move the base upwardly through the housing. In a preferred embodiment, the nipple and the aperture may be substantially disposed along the central longitudinal axis of the housing.

The top portion of the push stand receives the housing via the opening formed within the inner edge of the lip portion of the housing. Advantageously, the base is caused to move upwardly through the housing and remove a plant therefrom when the housing is moved downwardly along the push stand. In particular, the upward force exerted on the base member, when the housing is moved downwardly along the push stand, pushes the base member and root system of the plant upward so that it can be easily lifted out of the pot. This is particularly helpful when transplanting bushes and small trees that may be heavy or have elongated root systems.

The plant pot may further include a water tray including a bottom surface and upwardly extending sidewalls integral therewith. The bottom portion of the housing is removably positionable between the sidewalls of the water tray. The water tray includes a plurality of projections integral with the bottom surface thereof, and extending substantially vertically and upwardly therefrom, for receiving the lip portion thereon and for assisting to maintain the housing spaced above the bottom surface of the water tray. The water tray collects any excess water that may drain through the aperture and any topsoil that may spill out of the pot. This prevents the plant pot from staining the surface upon which it rests.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is a perspective view of the housing positioned in a water tray;

FIG. 3 is a cross-sectional view taken along line 3—3 in FIG. 2; and

DETAILED DESCRIPTION OF THE INVENTION

Figure 1:
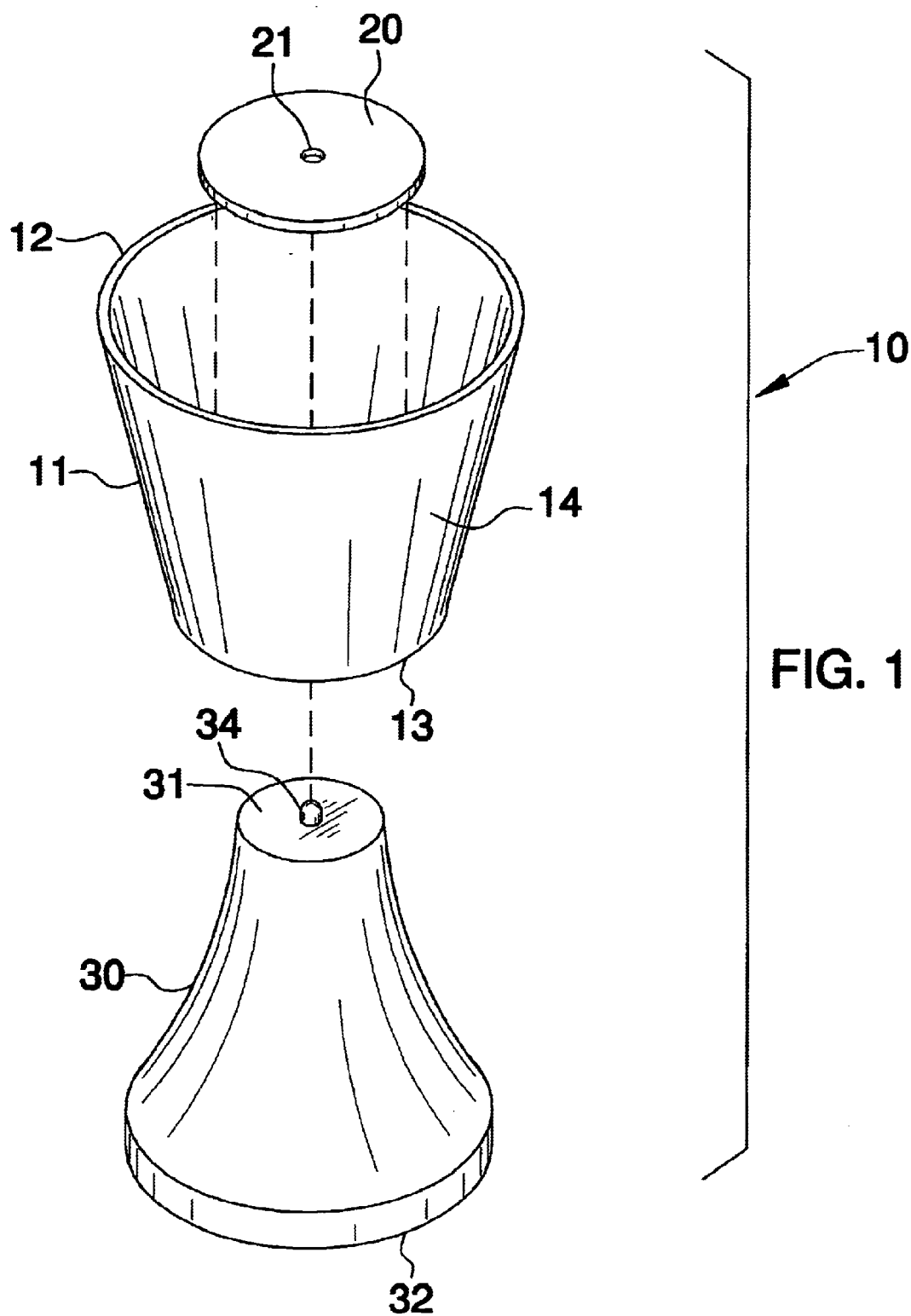
FIG. 1 is an exploded perspective view showing a plant pot with a removable base member and a push stand, in accordance with the present invention.

The present invention will now be described more fully hereinafter with reference to the accompanying drawings, in which a preferred embodiment of the invention is shown.

This invention may, however, be embodied in many different forms and should not be construed as limited to the embodiment set forth herein. Rather, this embodiment is provided so that this application will be thorough and complete, and will fully convey the true scope of the invention to those skilled in the art.

The apparatus of this invention is referred to generally in FIGS. 1–4 by the reference numeral 10 and is intended to provide a plant pot from which plants can be easily removed. It should be understood that the plant pot 10 may be used for the planting and removal of different types and sizes of plants, bushes, and trees and should not be limited to any particular type or size.

Initially referring to FIG. 1, the plant pot 10 includes a housing 11, preferably formed of durable and pliable plastic material, for maintaining a plant therein. The housing has top 12 and bottom 13 portions and a sidewall 14 integral therewith and extending therebetween. The housing 11 has a centrally disposed longitudinal axis (not shown) wherein the sidewall 14 is spaced and diverges upwardly therefrom. The top portion 12 is open for allowing a plant to be selectively positioned within the housing 11, as perhaps best shown in FIG. 2.

Now referring to FIG. 3, the bottom portion 13 includes a lip portion 15 formed around a perimeter thereof and includes an inner edge portion 16 for defining an opening therebetween. The bottom portion 13 further includes a base member 20 having a substantially annular shape removably positionable on the lip portion 15 and for maintaining a plant thereabove. Of course, the base member 20 may be square or rectangular, for example, without departing from the true scope of the invention. The base member 20 has an aperture 21 disposed substantially centrally thereof, as at perhaps best shown in FIG. 1.

Figure 4:
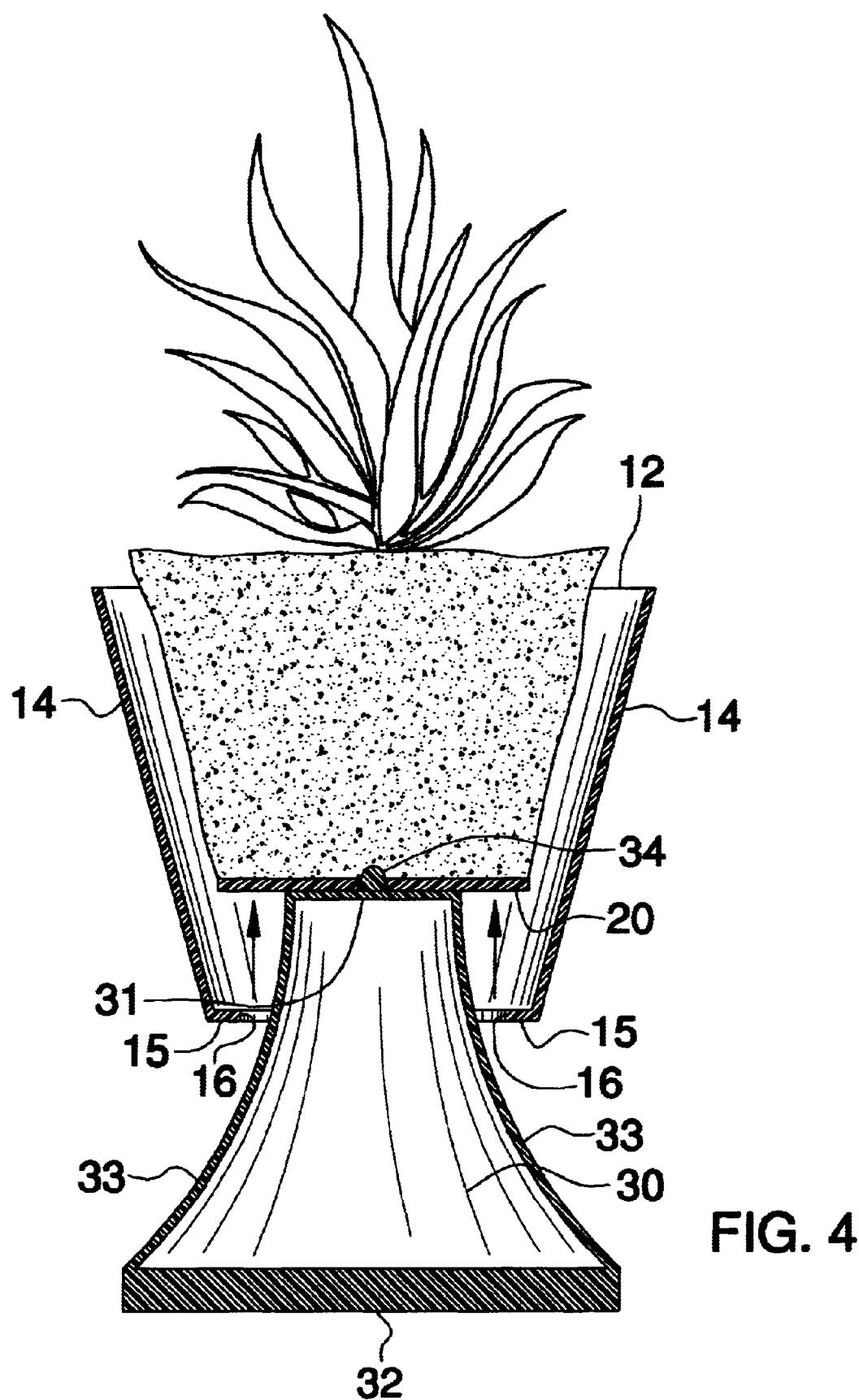
FIG. 4 is a cross-sectional view of the present invention showing the base member moving upwardly through the housing for removing a plant therefrom.

Now referring to FIG. 4, the plant pot 10 further includes a push stand 30 having top 31 and bottom 32 portions and a sidewall 33 diverging downwardly between the top 31 and bottom 32 portions. The push stand 30 includes a nipple 34 substantially aligned with the aperture 21, connected to the top portion 31 thereof and extending upwardly therefrom. Such a nipple 34 is removably insertable into the aperture 21 for assisting to securely move the base 20 upwardly through the housing 11. In a preferred embodiment, the nipple 34 and the aperture 21 are substantially disposed along the central longitudinal axis of the housing 11.

The top portion 31 of the push stand 30 receives the housing 11 via the opening formed within the perimeter of the inner edge portion 16 of the lip portion 15 to thereby cause the base member 20 to move upwardly through the housing 11 and remove a plant therefrom when the housing 11 is moved downwardly along the push stand 30. The upward force exerted on the base member, by moving the housing 11 downwardly along the push stand 30, pushes the base member 20 and root system of the plant upward so that it can be easily lifted out of the pot without damaging the root system or straining the back muscles of a user. This makes it possible for a single user to lift small trees and bushes out of pots that otherwise would be too bulky for one person to handle.

Now referring to FIG. 2 and FIG. 3, the plant pot 10 further includes a water tray 40 with a bottom surface 41 and upwardly extending sidewalls 42 integral therewith. The bottom portion 13 of the housing 11 is removably positionable between the sidewalls 42 of the water tray 40. The water tray 40 includes a plurality of projections 43 integral with the bottom surface 41 thereof and extending substantially vertically and upwardly therefrom. The plurality of projections 43 receive the lip portion 15 thereon and assist in maintaining the housing 11 spaced above the bottom surface 41 of the water tray 40. Advantageously, the water tray 40 collects excess water draining through the aperture 21 and any soil that might spill out of the plant pot 10. This prevents the plant pot 10 from staining any surface upon which it may rest.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A plant pot comprising:
   a housing for maintaining a plant therein and including top and bottom portions and a sidewall integral therewith and extending therebetween, said housing having a centrally disposed longitudinal axis wherein said sidewall is spaced therefrom and diverges upwardly therefrom, said top portion being open for allowing a plant to be selectively positioned within said housing, said bottom portion including a lip portion formed around a perimeter thereof and including an inner edge portion for defining an opening therebetween;
   a base member removably positionable on said lip portion and for maintaining a plant thereabove, said base member having a substantially solid top surface and further having an aperture disposed substantially centrally thereof; and
   a push stand having top and bottom portions and a sidewall diverging downwardly between said top and bottom portions, said top portion of said push stand having a diameter smaller than a diameter of the opening for receiving said housing via the opening between said lip portion to thereby cause said base to move upwardly through said housing and remove a plant and associated root ball from said housing when said housing is moved downwardly along said push stand, said bottom portion of said push stand having a diameter greater than a diameter of the opening, said push stand comprising means for limiting the downward movement of said housing to generally medially of said top and bottom portions of said push stand and thereby allowing said base to be suspended generally medially of said top and bottom portions of said housing.

2. The plant pot of claim 1, wherein said push stand comprises a nipple connected to said top portion thereof and extending upwardly therefrom, said nipple being removably insertable into the aperture and for assisting to securely move said base upwardly through said housing.

3. The plant pot of claim 1, further comprising a water tray including a bottom surface and upwardly extending sidewalls integral therewith, said bottom portion of said housing being removably positionable between said sidewalls of said water tray.

4. The plant pot of claim 3, wherein said water tray comprises a plurality of projections integral with said bottom surface thereof and extending substantially vertically and upwardly therefrom, said plurality of projections for receiving said lip portion thereon and assisting to maintain said housing spaced above said bottom surface of said water tray.

5. The plant pot of claim 2, wherein said nipple is substantially aligned with the aperture.

6. The plant pot of claim 2, wherein said nipple and the aperture are substantially disposed along the central longitudinal axis of said housing.

7. The plant pot of claim 1, wherein said base has a substantially annular shape.

8. A plant pot comprising:
   a housing for maintaining a plant therein and including top and bottom portions and a sidewall integral therewith and extending therebetween, said housing having a centrally disposed longitudinal axis wherein said sidewall is spaced therefrom and diverges upwardly therefrom, said top portion being open for allowing a plant to be selectively positioned within said housing, said bottom portion including a lip portion formed around a perimeter thereof and including an inner edge portion for defining an opening therebetween;

a base member removably positionable on said lip portion and for maintaining a plant thereabove, said base member having a substantially solid top surface and further having an aperture disposed substantially centrally thereof; and a push stand having top and bottom portions and a sidewall diverging downwardly between said top and bottom portions, said top portion of said push stand having a diameter smaller than a diameter of the opening for receiving said housing via the opening between said lip portion to thereby cause said base to move upwardly through said housing and remove a plant and associated root ball from said housing when said housing is moved downwardly along said push stand, said bottom portion of said push stand having a diameter greater than a diameter of the opening, said push stand comprising means for limiting the downward movement of said housing to generally medially of said top and bottom portions of said push stand and thereby allowing said base to be suspended generally medially of said top and bottom portions of said housing; and a nipple connected to said top portion of said push stand and extending upwardly therefrom, said nipple being removably insertable into the aperture and for assisting to securely move said base upwardly through said housing.

9. The plant pot of claim 8, further comprising a water tray including a bottom surface and upwardly extending sidewalls integral therewith, said bottom portion of said housing being removably positionable between said sidewalls of said water tray.

10. The plant pot of claim 9, wherein said water tray comprises a plurality of projections integral with said bottom surface thereof and extending substantially vertically and upwardly therefrom, said plurality of projections for receiving said lip portion thereon and assisting to maintain said housing spaced above said bottom surface of said water tray.

11. The plant pot of claim 8, wherein said nipple is substantially aligned with the aperture.

12. The plant pot of claim 8, wherein said nipple and the aperture are substantially disposed along the central longitudinal axis of said housing.

13. The plant pot of claim 8, wherein said base has a substantially annular shape.

14. A plant pot comprising:
   a housing for maintaining a plant therein and including top and bottom portions and a sidewall integral therewith and extending therebetween, said housing having a centrally disposed longitudinal axis wherein said sidewall is spaced therefrom and diverges upwardly therefrom, said top portion being open for allowing a plant to be selectively positioned within said housing, said bottom portion including a lip portion formed around a perimeter thereof and including an inner edge portion for defining an opening therebetween;

a base member removably positionable on said lip portion and for maintaining a plant thereabove, said base member having a substantially solid top surface and further having an aperture disposed substantially centrally thereof; and a push stand having top and bottom portions and a sidewall diverging downwardly between said top and bottom portions, said top portion of said push stand having a diameter smaller than a diameter of the opening for receiving said housing via the opening between said lip portion to thereby cause said base to move upwardly through said housing and remove a plant and associated root ball from said housing when said housing is moved downwardly along said push stand, said bottom portion of said push stand having a diameter greater than a diameter of the opening, said push stand comprising means for limiting the downward movement of said housing to generally medially of said top and bottom portions of said push stand and thereby allowing said base to be suspended generally medially of said top and bottom portions of said housing;

a nipple connected to said top portion of said push stand and extending upwardly therefrom, said nipple being removably insertable into the aperture and for assisting to securely move said base upwardly through said housing; and a water tray including a bottom surface and upwardly extending sidewalls integral therewith, said bottom portion of said housing being removably positionable between said sidewalls of said water tray.

15. The plant pot of claim 14, wherein said water tray comprises a plurality of projections integral with said bottom surface thereof and extending substantially vertically and upwardly therefrom, said plurality of projections for receiving said lip portion thereon and assisting to maintain said housing spaced above said bottom surface of said water tray.

16. The plant pot of claim 14, wherein said nipple is substantially aligned with the aperture.

17. The plant pot of claim 14, wherein said nipple and the aperture are substantially disposed along the central longitudinal axis of said housing.

18. The plant pot of claim 14, wherein said base has a substantially annular shape.

* * * * *